United States Patent
Yamazaki et al.

(10) Patent No.: US 10,807,619 B2
(45) Date of Patent: Oct. 20, 2020

(54) DISC BRAKE DEVICE AND DISC BRAKE FOR RAILWAY

(71) Applicant: AKEBONO BRAKE INDUSTRY CO., LTD., Tokyo (JP)

(72) Inventors: Akihiko Yamazaki, Tokyo (JP); Yoshikazu Harigai, Tokyo (JP)

(73) Assignee: AKEBONO BRAKE INDUSTRY CO., LTD., Tokyo (JP)

(*) Notice: Subject to any disclaimer, the term of this patent is extended or adjusted under 35 U.S.C. 154(b) by 299 days.

(21) Appl. No.: 15/504,819

(22) PCT Filed: Aug. 20, 2015

(86) PCT No.: PCT/JP2015/073393
§ 371 (c)(1),
(2) Date: Feb. 17, 2017

(87) PCT Pub. No.: WO2016/027860
PCT Pub. Date: Feb. 25, 2016

(65) Prior Publication Data
US 2017/0267262 A1    Sep. 21, 2017

(30) Foreign Application Priority Data

Aug. 22, 2014 (JP) ................................. 2014-169559

(51) Int. Cl.
*B61H 5/00* (2006.01)
*F16D 65/02* (2006.01)
(Continued)

(52) U.S. Cl.
CPC ........... *B61H 5/00* (2013.01); *F16D 55/2245* (2013.01); *F16D 55/2255* (2013.01);
(Continued)

(58) Field of Classification Search
CPC ....... B61H 5/00; B61H 13/38; F16D 55/2245; F16D 65/0978; F16D 69/0408; F16D 2125/645; F16D 65/095
See application file for complete search history.

(56) References Cited

U.S. PATENT DOCUMENTS 2,890,767 A * 6/1959 Tack .................... B61H 5/00
188/205 R
4,060,153 A * 11/1977 Kobelt ................... B66D 5/14
188/212

(Continued)

FOREIGN PATENT DOCUMENTS

CN        1965173 A      5/2007
CN      101285511 A     10/2008
(Continued)

OTHER PUBLICATIONS

JP Office Action dated Feb. 6, 2018 from corresponding Japanese patent application No. 2014-169559 (with attached English-language translation).
(Continued)

*Primary Examiner* — Bradley T King
*Assistant Examiner* — James K Hsiao
(74) *Attorney, Agent, or Firm* — Faegre Drinker Biddle & Reath LLP

(57) ABSTRACT

In a disc brake apparatus, a parallelism maintaining control mechanism for pressing lining surfaces of pads against a disc rotor in parallel includes a pressure plate which is brought into abutment with a pad holding member, a link arm having a fixing shaft projecting from a caliper body in parallel to a side surface of a disc rotor, a moving shaft disposed in parallel to the fixing shaft and pivotally supporting the pressure plate, joint members which connect the fixing shaft and the moving shaft in parallel to each other and a connecting shaft for pivotally connecting the joint (Continued)

members to each other, and a spring member for pressing the pressure plate against the pad holding member.

9 Claims, 13 Drawing Sheets

(51) Int. Cl.
    *F16D 55/22*     (2006.01)
    *F16D 55/2255*     (2006.01)
    *F16D 65/095*     (2006.01)
    *F16F 1/18*     (2006.01)
    *F16D 55/224*     (2006.01)
    *F16D 65/00*     (2006.01)
    *F16D 65/097*     (2006.01)
    *F16D 69/04*     (2006.01)
    *F16D 69/00*     (2006.01)
    *F16D 125/64*     (2012.01)

(52) U.S. Cl.
    CPC ......... *F16D 65/0068* (2013.01); *F16D 65/02* (2013.01); *F16D 65/095* (2013.01); *F16D 65/0978* (2013.01); *F16D 69/0408* (2013.01); *F16F 1/18* (2013.01); *F16D 2069/004* (2013.01); *F16D 2125/645* (2013.01)

(56) References Cited

U.S. PATENT DOCUMENTS

| | | | | |
|---|---|---|---|---|
| 4,393,962 A * | 7/1983 | Kobelt | ................ | F16D 55/2245 188/59 |
| 4,454,932 A * | 6/1984 | Emilsson | ................ | B61H 5/00 188/206 R |
| 4,697,671 A * | 10/1987 | Stewart | ................ | F16D 55/2245 188/250 G |
| 5,058,712 A * | 10/1991 | Noah | ................ | B61H 5/00 188/206 R |
| 5,813,499 A * | 9/1998 | Staltmeir | ................ | B61H 5/00 188/59 |
| 6,551,003 B1 * | 4/2003 | De La Fuente-Farias | ................ | B60T 11/06 188/219.1 |
| 6,722,477 B1 * | 4/2004 | Wolfsteiner | ............. | B61H 5/00 188/173 |
| 9,371,078 B2 * | 6/2016 | Tsurusaki | ................ | B61H 5/00 |
| 9,896,112 B2 * | 2/2018 | Suzuki | ................ | B61H 5/00 |
| 2007/0246312 A1 | 10/2007 | Bach et al. | | |
| 2009/0229930 A1 * | 9/2009 | Emilsson | ................ | B61H 5/00 188/58 |
| 2012/0298456 A1 | 11/2012 | Morris et al. | | |
| 2014/0231188 A1 | 8/2014 | Prouzet | | |
| 2014/0326547 A1 * | 11/2014 | Yano | ................ | B61H 1/00 188/72.2 |
| 2015/0021126 A1 | 1/2015 | Tsurusaki et al. | | |
| 2015/0353107 A1 * | 12/2015 | Taguchi | ................ | B61H 5/00 188/72.9 |
| 2015/0353108 A1 * | 12/2015 | Taguchi | ................ | B61H 5/00 188/72.9 |
| 2016/0137213 A1 * | 5/2016 | Kimura | ............... | F16D 55/2255 188/71.9 |
| 2017/0058977 A1 * | 3/2017 | Yano | ................ | B61H 5/00 |

FOREIGN PATENT DOCUMENTS

| | | |
|---|---|---|
| CN | 102278398 A | 12/2011 |
| EP | A1-2713075 | 4/2014 |
| JP | S61-116128 A | 6/1986 |
| JP | A-2008-261439 | 10/2008 |
| JP | 2008-296756 A | 12/2008 |
| JP | 2009-536119 A | 10/2009 |
| JP | A-2013-123990 | 6/2013 |

OTHER PUBLICATIONS

Extended European Search Report dated Mar. 26, 2018 in corresponding European patent application 15833883.0 (6 pages).
Chinese Office Action, along with its English-language translation, dated May 17, 2018 that issued in Chinese patent application No. 201580045149.4 attached.
EP Office Action dated Aug. 5, 2019 from corresponding European patent application No. 15833883.0, (4 pages).
International Preliminary Report on Patentability dated Feb. 28, 2017 for PCT/JP2015/073393.
Communication pursuant to Article 94(3) EPC issued Jul. 30, 2020 in European Patent Application No. 15 833 883.0.

* cited by examiner

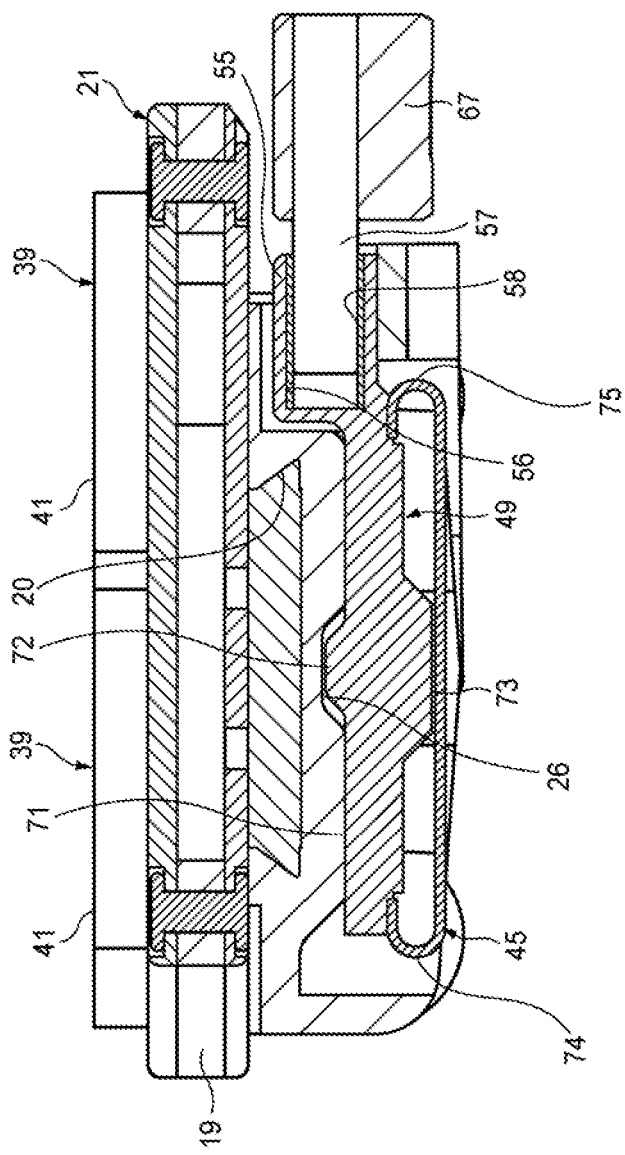

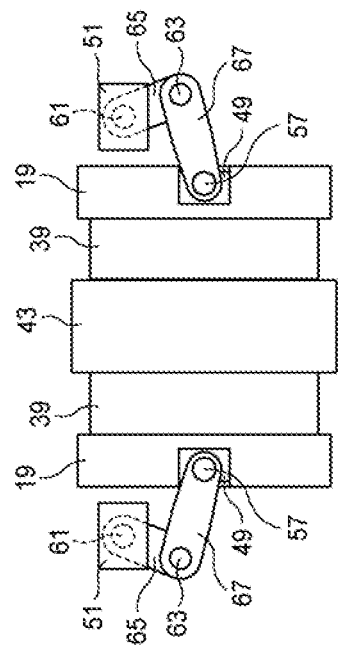
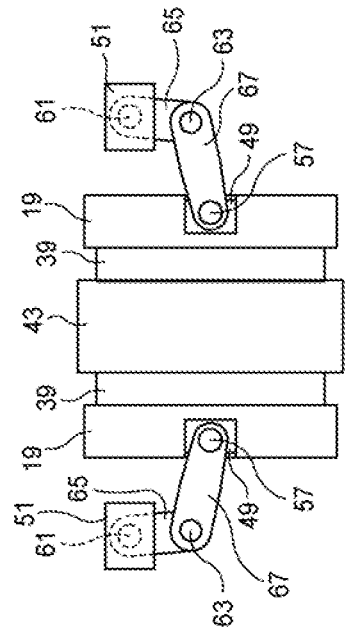
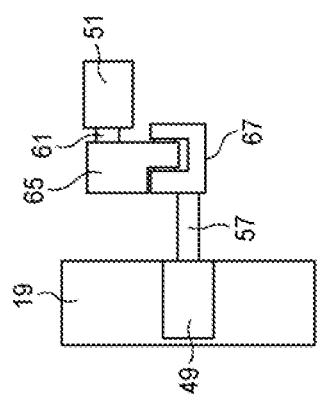
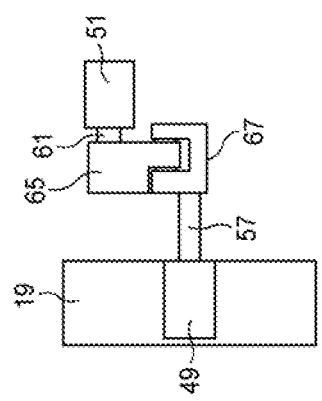

DISC BRAKE DEVICE AND DISC BRAKE FOR RAILWAY

TECHNICAL FIELD

The present invention relates to a disc brake apparatus and a disc brake for a railway vehicle.

BACKGROUND ART

There are known disc brake apparatuses in which a braking force is produced by pressing pads against a disc rotor (refer to Patent Literature 1).

As shown in FIG. 13, a disc brake caliper 501 for a railway vehicle disclosed in Patent Literature 1 includes brake pad holders 505 which are suspended to lie on both sides of a brake disc (not shown) to be braked and which move only on planes which are normal to a substantially horizontal center line of the caliper. Replaceable brake pads 509 are provided individually on the brake pad holders 505 so as to be brought into frictional engagement with the brake disc.

The disc brake caliper 501 has an attachment bracket 503, and the attachment bracket 503 is attached to an undercarriage or bogie of a railway vehicle. The attachment bracket 503 makes up a three-point support structure and bifurcates towards the front. Suspension links 507 are rotatably suspended at respective front end portions of the bifurcated attachment bracket 503. Rotating shafts of the suspension links 507 are parallel to the center line of the caliper and the brake disc. The suspension links 507 are connected rotatably to the corresponding brake pad holders 505 at lower end portions thereof. Rotating shafts of the suspension links 507 are parallel to the rotating shafts described above and therefore are parallel to the center line of the caliper.

Upper levers 515 and lower levers 517, which correspond to sides of the disc brake caliper 501, are provided at a central portion of a bridge component 511 which is connected to the attachment bracket 503 by an elastic connecting portion 513. A shaft 519 is provided between each of the pairs of upper lever 515 and lower lever 517. Front end portions of the levers 515 and the levers 517 are attached rotatably to the brake pad holders 505 so that the levers 515 and the levers 517 an rotate about rotating shafts which are normal to the center line of the caliper.

A braking unit 521 is connected rotatably to rear end portions of the levers 515 and the levers 517 in a suspended fashion. When compressed air is taken into a brake cylinder, the braking unit 521 pushes the rear end portions of the levers 515 and the levers 517 so that the rear end portions move laterally away from each other, whereby the front end portions of the levers 515 and the levers 517 cooperate to cause the brake pads 509 to apply a braking force to the brake disc.

In the disc brake caliper 501, the brake pad holders 505 are guided in a fixed fashion relative to the planes which are normal to the center of the caliper by the suspension links 507 of the brake pad holders 505, while all the other constituent elements of the caliper are guided in an elastic fashion in every direction by the elastic connecting portion 513 provided between the attachment bracket 503 and the bridge component 511.

By adopting this configuration, the brake pad holders 505 are suspended so as to move only on the planes which are normal to the center of the caliper, so that the brake pad holders 505 are equally pressed against the brake disc when the brake is applied. Namely, the disc brake caliper 501 is configured so that parallelism between the brake pad holders 505 is maintained by the suspension links 507 which make up a parallelism maintaining control mechanism even though the attachment bracket 503 and the levers 515 and the levers 517, which are supported on the attachment bracket 503, are caused to swing laterally.

CONVENTIONAL ART LITERATURE

Patent Literature

[Patent Literature 1] JP-A-2009-536119

SUMMARY OF INVENTION

Problem that the Invention is to Solve

In the conventional disc brake caliper 501, however, the suspension links 507 which are provided at the upper portion to make up the parallelism maintaining control mechanisms are enlarged in size because the suspension links 507 bear the braking torque. Then, there has been desired a disc brake apparatus including parallelism maintaining control mechanisms which are light in weight and compact in size.

The invention has been made in view of the situations, and an object thereof is to provide a disc brake apparatus and a disc brake for a railway vehicle which can allow postures of pads to be maintained parallel to a disc rotor by means of parallelism maintaining control mechanisms which are compact in size.

Means for Solving the Problem

The above object of the invention would be attained by the following configurations.

(1) A disc brake apparatus including:
a base member;
a pair of brake arms pivotally supported to be swingable with respect to the base member;
an actuator connected to one of swing ends of each of the pair of brake arms so as to move the brake arms away from each other;
a pad holding member pivotally supported at the other of the swing ends of the each of the pair of brake arms so as to freely turn; and
a parallelism maintaining control mechanism configured to press a lining surface of a pad held on the pad holding member to a disc rotor in a parallel fashion.

The parallelism maintaining control mechanism is disposed near a center along a swing axis of the each of the brake arms so as to connect the base member and the pad holding member together.

According to the disc brake apparatus configured as described under (1) above, since the parallelism maintaining control mechanism is disposed near the center along the oscillating center axis of the brake arm and no braking torque is inputted directly into the parallelism maintaining control mechanism, it is possible to realize the parallelism maintaining control mechanism which is small in size and light in weight.

(2) A disc brake apparatus including:
a base member;
a pair of brake arms pivotally supported to be swingable with respect to the base member;
an actuator connected to one of swing ends of each of the pair of brake arms so as to move the brake arms away from each other;

a pad holding member pivotally supported at the other of the swing ends of the each of the pair of brake arms so as to freely turn; and a parallelism maintaining control mechanism configured to press a lining surface of a pad held on the pad holding member to a disc rotor in a parallel fashion, The parallelism maintaining control mechanism includes a link arm which comprises:

a fixing shaft projecting from the base member so as to be parallel to a side surface of the disc rotor, a moving shaft disposed parallel to the fixing shaft and fitted in a moving shaft insertion hole in the pad holding member to be rotatable and movable back and forth;

at least two joint members which connect the fixing shaft and the moving shaft together in parallel; and at least one connecting shaft which supports the joint members so at to be rotatable with respect to each other.

According to the disc brake apparatus configured as described under (2) above, the pad holding member is guided by the parallelism maintaining control mechanism so that the lining surface of the pad held thereby becomes parallel to the disc rotor. The parallelism maintaining control mechanisms each have the link arm which brings the pad into press contact with the disc rotor in a parallel fashion. The link arms are each made up of the fixing shaft, the moving shaft, at least two of the joint members and the connecting shaft. The moving shaft is allowed to move not only in the up-and-down direction but also in the directions in which the moving shaft moves towards and away from the disc rotor while being maintained parallel relative to the disc rotor by the link arm.

The moving shaft inserting hole in the pad holding member is fitted on the moving shaft in the direction in which the lining surface of the pad becomes parallel to the disc rotor in such a way that the moving shaft rotates and moves back and forth in the moving shaft inserting hole.

By adopting this configuration, the parallelism maintaining control mechanism can maintain the posture of the pad holding member so that the lining surface of the pad becomes parallel to the disc rotor. The link arm has the two or more joint members. By adopting this configuration, when compared with the conventional suspension link which is one long joint member, the individual joint members can be made short, whereby even with the compact construction, the link arm can allow the moving shaft to translate in a horizontal direction relative to the fixing shaft.

Consequently, it is possible to provide the disc brake apparatus which includes the compact parallelism maintaining control mechanisms.

(3) A disc brake apparatus including:

a base member;

a pair of brake arms pivotally supported to be swingable with respect to the base member;

an actuator connected to one of swing ends of each of the pair of brake arms so as to move the brake arms away from each other;

a pad holding member pivotally supported at the other of the swing ends of the each of the pair of brake arms so as to freely turn; and a parallelism maintaining control mechanism configured to press a lining surface of a pad held on the pad holding member to a disc rotor in a parallel fashion.

The parallelism maintaining control mechanism includes:

a pressure plate which is brought into abutment with the pad holding member;

a link arm including:

a fixing shaft projecting from the base member so as to be parallel to a side surface of the disc rotor, a moving shaft which is disposed parallel to the fixing shaft and which supports the pressure plate so as to be rotatable and movable back and forth;

at least two joint members which connect the fixing shaft and the moving shaft together in parallel; and at least one connecting shaft which supports the joint members so at to be rotatable with respect to each other; and a spring member which elastically biases an abutment surface of the pressure plate in a direction in which the abutment surface is pressed against the pad holding member.

According to the disc brake apparatus configured as described under (3) above, the pad holding member is guided by the parallelism maintaining control mechanism so that the lining surface of the pad held thereby becomes parallel to the disc rotor. The parallelism maintaining control mechanisms each have the pressure plate and the link arm which bring the pad into press contact with the disc rotor in a parallel fashion. The link arms are each made up of the fixing shaft, the moving shaft, at least two of the joint members and the connecting shaft. The moving shaft is allowed to move not only in the up-and-down direction but also in the directions in which the moving shaft moves towards and away from the disc rotor while being maintained parallel relative to the disc rotor by the link arm.

The pressure plate is fixedly placed on the moving shaft in a direction in which the abutment surface of the pressure plate becomes parallel to the disc rotor and is supported so as not only to rotate but also to move back and forth thereon.

The spring member is fixed to the pad holding member, and the spring member elastically biases the abutment surface of the pressure plate in the direction in which the abutment surface is pressed against the pad holding member. By adopting this configuration, in a normal state where a load of a certain magnitude or greater is not applied to the parallelism maintaining control mechanism, the posture of the pad holding member which is tightly secured to the abutment surface of the pressure plate is maintained so that the lining surface of the pad becomes parallel to the disc rotor. The link arm has the two or more joint members. By adopting this configuration, when compared with the conventional suspension link which is one long joint member, the individual joint members can be made short, whereby even with the compact construction, the link arm can allow the moving shaft which pivotally supports the pressure plate to translate in a horizontal direction relative to the fixing shaft.

Consequently, it is possible to provide the disc brake apparatus which includes the compact parallelism maintaining control mechanisms.

On the other hand, when a load of a certain degree or greater is applied to the pad holding member via the pad whereby a moment load of the pad holding member is transmitted to the abutment surface of the pressure plate, the pressure plate is allowed to move relative to the pad holding member against the biasing force of the spring member.

The abutment surface of the pressure plate and the pad holding member are released from the tightly secured state, thereby making it possible to generate a gap therebetween. Consequently, the pad holding member (the pad) can change its angle along the disc rotor, whereby the lining surface of the pad can be pressed against the disc rotor uniformly. In addition, since the abutment surface of the pressure plate can move relative to the pad holding member, an excessive load that would otherwise be applied to the link arm is eliminated.

(4) The disc brake apparatus configured as described under (3) above, in which a pair of engagement holes whose center axes extend along an up-and-down direction are depressed into an upper and lower surfaces of the pressure plate which are at right angles to the abutment surface thereof, and wherein locking projecting portions which lock individually the engagement holes to the pad holding member are fitted individually loosely in the holes so as to generate a gap which permits a predetermined inclination of the locking projecting portions.

According to the disc brake apparatus configured as described under (4) above, the pressure plate can be assembled to the pad holding member by locking the engagement holes of the pressure plate by the locking projecting portions of the pad holding member, thereby assembly becomes easy. Since the locking projecting portions are individually loosely fitted in the engagement holes of the pressure plate so as to generate the gap which permits the predetermined inclination of the locking projecting portion, there is no such situation that the relative movement of the pressure plate to the pad holding member is interrupted.

(5) The disc brake apparatus configured as described under (3) or (4) above, in which the abutment surface of the pressure plate is guided so as to move relative to the pad holding member.

According to the disc brake apparatus configured as described (5) above, the abutment surface of the pressure plate is allowed to move smoothly relative to the pad holding member.

(6) The disc brake apparatus configured as described under any one of (3) to (5) above, in which the fixing shaft is fixed to each of bearing bosses which support the pair of brake arms so as to be swingable relative to the base member, and wherein the pressure plate is pressed against a longitudinally middle portion of the pad holding member along a turning shaft thereof.

According to the disc brake apparatus configured as described under (6) above, the parallelism maintaining control mechanism is situated so as to connect the longitudinally middle portion of the pad holding member along the turning shaft thereof which lies near a center of the pad and the bearing boss of the base member together and is configured light in weight and small in size.

(7) The disc brake apparatus configured as described under any one of (3) to (6) above, in which the spring member is formed of a plate spring which covers an outer surface of the pressure plate.

According to the disc brake apparatus configured as described under (7) above, the pressure plate is covered by the spring member to thereby be protected against damage made by a piece of flying stone. In addition, since the spring member is disposed on a mechanism surface side (an opposite side to a side facing the disc rotor) of the parallelism maintaining control mechanism which is visible from an exterior portion, it is possible to easily verify how the spring member is attached to the parallelism maintaining control mechanism or whether or not the spring member is damaged in a visual fashion. Additionally, through holes are formed in support plate portions which are formed at an upper and lower edges of the spring member which is formed of the plate spring, and the locking projecting portions of the pad holding members which lock the engagement hole of the pressure plate are put through the through holes, whereby the spring member is supported on the pad holding member.

(8) A disc brake for a railway vehicle including the disc brake apparatus according to any one of (1) to (7).

According to the disc brake for a railway vehicle configured as described under (8) above, it is possible to provide the disc brake apparatus including the parallelism maintaining control mechanism which is compact in size. In addition, when the wheel (the disc rotor) is inclined, the lining surface of the pad is allowed to follow the wheel (the disc rotor) in parallel. By doing so, when braking the railway vehicle which is running on a curved track or a track having alternate right and left turns, in the event that the wheel (the disc rotor) is inclined, the pad holding member which is released from the tightly secured state with the pressure plate against the biasing force of the spring member follows the wheel (the disc rotor) in parallel. As a result, a load is eliminated which would otherwise be applied to the parallelism maintaining control mechanism by the inclined wheel (disc rotor).

In this way, in the disc brake for a railway vehicle, in the event that the pad is inclined when braking the railway vehicle which is running on the curved track or the track having alternate left and right turns, the tightly secured state between the pad and the pressure plate is released so as not to interrupt the braking operation of the pad. Moreover, the link arm of the parallelism maintaining control mechanism is also prevented from bearing an excessive load.

Advantageous Effect of Invention

According to the disc brake apparatus and the disc brake for a railway vehicle of the invention, the pad and the disc rotor are allowed to keep their parallel postures to each other by the compact parallelism maintaining control mechanism.

Thus, the present invention has briefly been described heretofore. Further, by perusing a mode for carrying out the invention (hereinafter, referred to as an "embodiment") which will be described below with reference to accompanying drawings, the present invention will be clarified in more detail.

BRIEF DESCRIPTION OF DRAWINGS

FIG. 8 is a sectional view taken along a line indicated by and viewed from arrows VIII-VIII in FIG. 2.

FIG. 9 shows schematic views of a main part of the disc brake apparatus illustrating an operation example of the link arm, wherein FIGS. 9A and 9B are a side view and a front view, respectively, of a pad which is new and FIGS. 9C and 9D are a side view and a front view, respectively, of the pad which is worn.

MODE FOR CARRYING OUT THE INVENTION

Hereinafter, embodiments of the present invention will be described with reference to the drawings.

Figure 1:
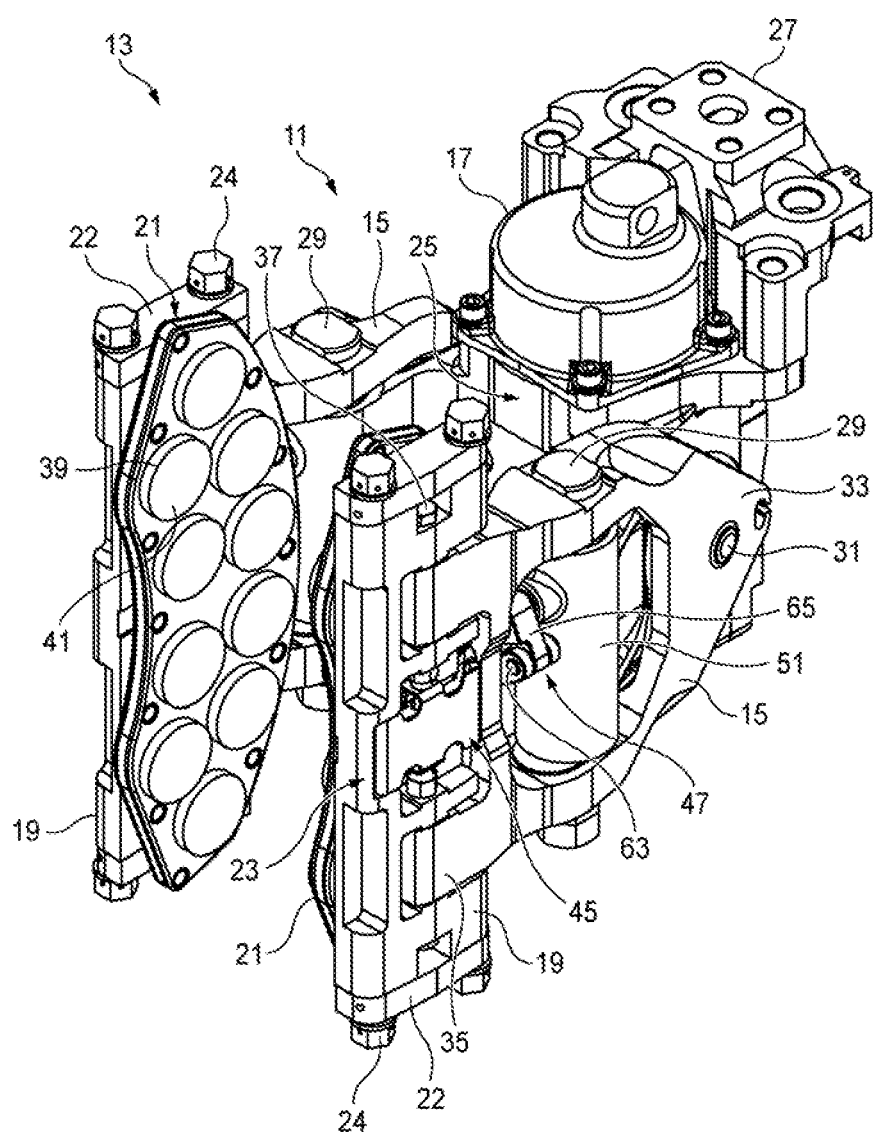
FIG. 1 is a perspective view of a disc brake apparatus according to a first embodiment of the invention.
Figure 2:
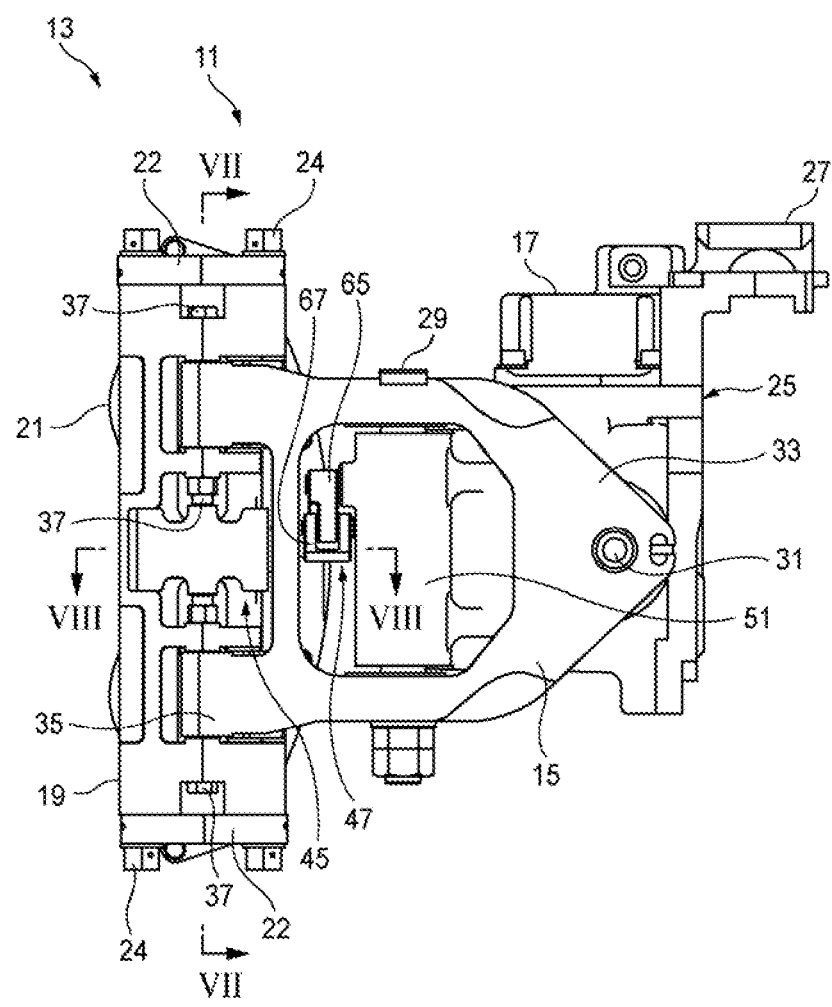
FIG. 2 is a side view of the disc brake apparatus shown in FIG. 1.
Figure 3:
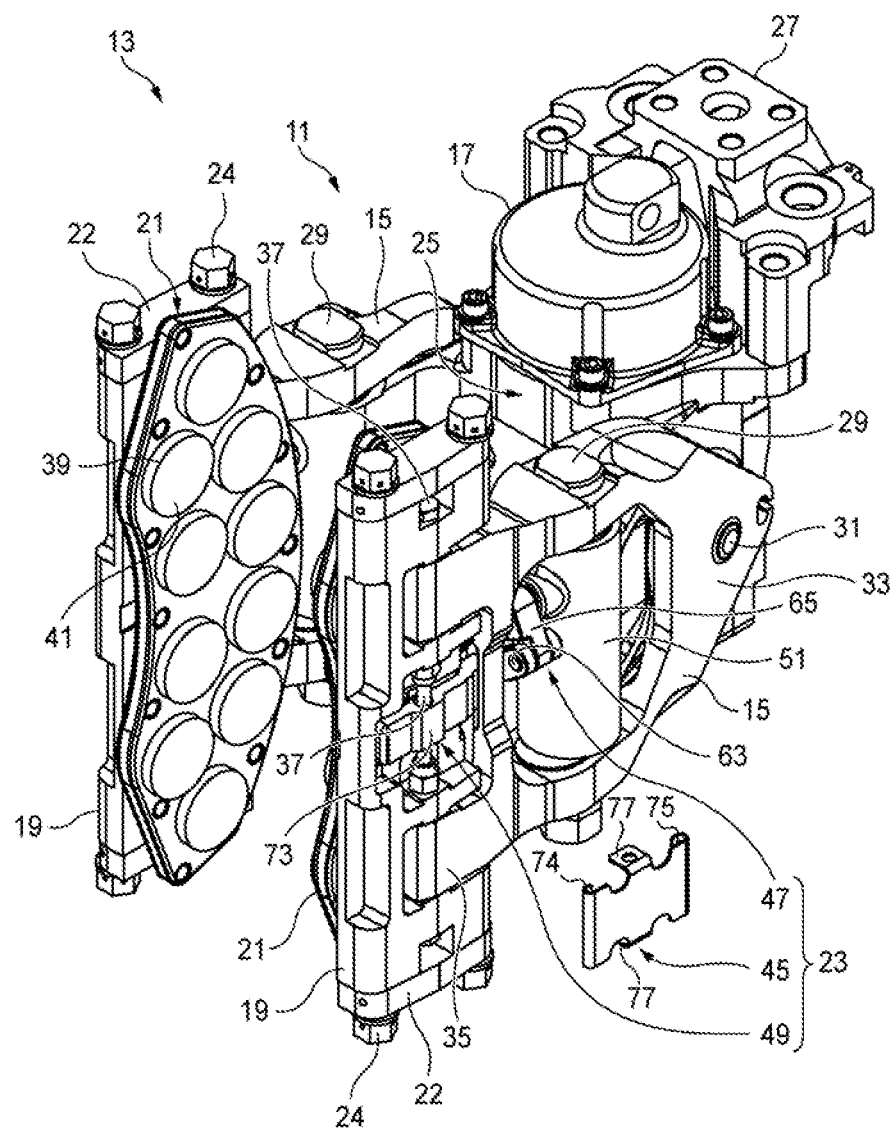
FIG. 3 is an exploded perspective view of the disc brake apparatus shown in FIG. 1 with a spring member removed therefrom.

As shown in FIGS. 1 to 3, a disc brake apparatus 11 according to a first embodiment of the invention will be described as being applied to a disc brake 13 for a railway vehicle. The disc brake apparatus according to the invention can also be applied to an industrial brake apparatus which generates a braking force against a rotary member as in an elevator, for example, in addition to the disc brake 13 for a railway vehicle.

The disc brake apparatus 11 according to the first embodiment includes a caliper body (a base member) 25, a pair of brake arms 15 which are supported so as to be swingable relative to the caliper body 25, an actuator 17 which is connected to swing ends 33 of the pair of brake arms 15 so as to move the brake arms 15 away from each other, pad holding members 19 which are supported at the other swing ends 35 of the pair of brake arms 15 so as to turn freely thereat, pad assemblies (pads) 21 which are held on the pad holding members 19, and a parallelism maintaining control mechanism 23 (refer to FIG. 3).

The caliper body 25, which is the base member, is fixed to a bogie or the like of a vehicle by a support 27. The pair of brake arms 15 are supported so as to be swingable relative to the caliper body 25 by arm shafts 29 (for example, swing shafts whose axes extend along an up-and-down direction). The actuator 17 is accommodated in the caliper body 25.

The actuator 17 includes a motor gear unit which is made up of an electric motor and a speed reduction mechanism, a hydraulic driving mechanism or an pneumatic driving mechanism, a servo mechanism and a pair of rods 31. In the actuator 17, the rods 31 are reciprocated via the servo mechanism as a result of the motor gear unit or the like being driven. The pair of rods 31 are connected to one of the swing ends 33 of the pair of brake arms 15. When activated, the actuator 17 causes one of the swing ends 33 of the pair of brake arms 15 to move away from each other via reciprocating rods 31. As a result, the other of the swing ends 35 of the pair of brake arms 15 are caused to move towards each other so as to narrow a gap therebetween.

The pad holding members 19 (also referred to as pad holders) are supported individually at the other swing ends 35 of the pair of brake arms 15 so as to turn (tilt) freely thereat by holder shafts 37 (for example, turning shafts whose axes extend along the up-and-down direction).

Dovetail grooves 20 (refer to FIG. 8) are carved individually on facing surfaces of the pair of pad holding members 19 which constitute inner surfaces thereof in a direction which follows the holder shafts 37. The pad assemblies 21 are individually slid to be inserted into the dovetail grooves 20 from lower sides thereof as shown in FIG. 1.

Figure 7:
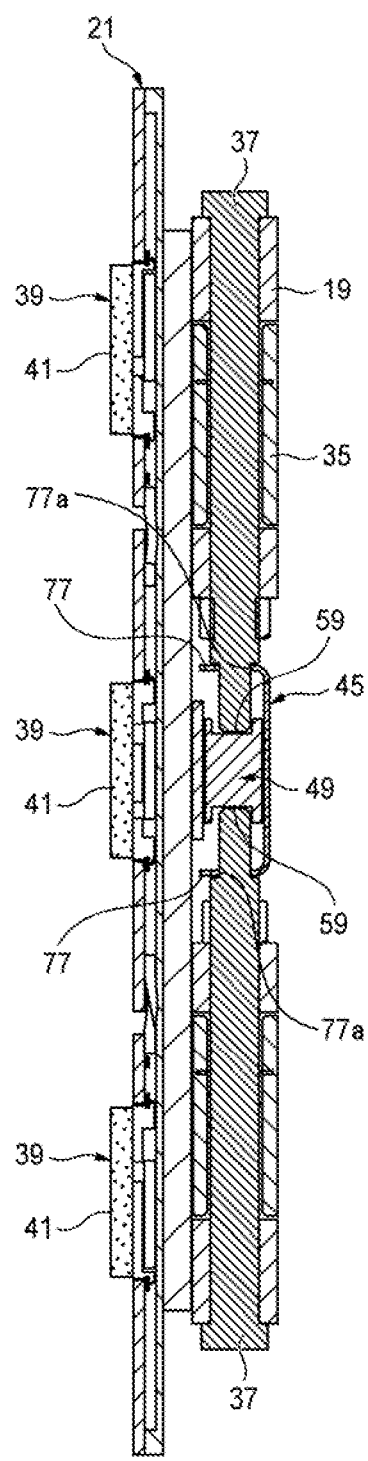
FIG. 7 is a sectional view taken along a line indicated by and viewed from arrows VII-VII in FIG. 2.

A plurality of pads 39 are held on each of the pad assemblies 21 in such a way that lining surfaces 41 thereof are directed so as to face a disc rotor (or a side surface of a wheel 43 shown in FIG. 7). The pad assembly 21 which is mounted in the dovetail groove 20 on the pad holding member 19 is fixed to the pad holding member 19 by fastening anchor blocks 22 which are attached individually to an upper end and lower end of the pad assembly 21 to the pad holding member 19 with bolts 24 (refer to FIG. 1).

In this embodiment, the lining surfaces 41 of the pads 39 will be described as being pressed against both side surfaces of the disc rotor which is assembled to the wheel 43 to execute a braking operation (refer to FIG. 7). Of course, the disc brake apparatus 11 may configured so that a disc rotor (whose illustration is omitted) provided separately from the wheel 43 is press held by the lining surfaces 41 of the pads 39 to brake the wheel 43.

As shown in FIG. 3, the parallelism maintaining control mechanism 23 according to the first embodiment is configured to press the lining surfaces 41 of the pads 39 which are held on the pad holding member 19 against a side surface of the wheel 43 (the disc rotor) in parallel and has a pressure plate 49, a link arm 47 and a spring member 45.

Figure 4:
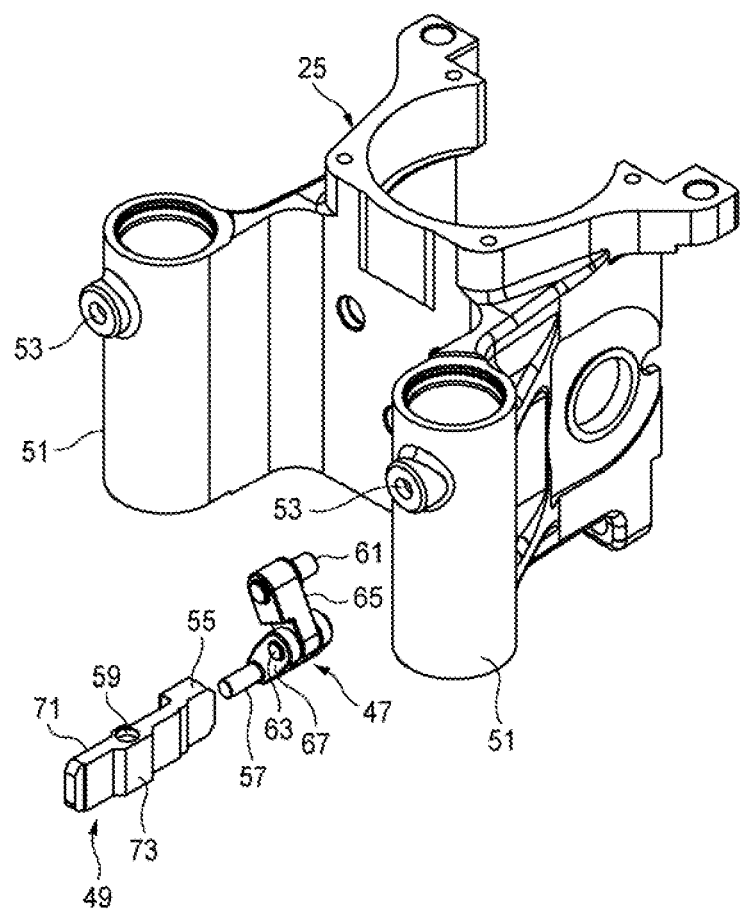
FIG. 4 is an exploded perspective view of a base member and a link arm shown in FIG. 3.

As shown in FIG. 4, the caliper body 25 has a pair of bearing bosses 51 which are formed cylindrical to support the corresponding arm shafts 29. Fixing holes 53 are opened individually in the bearing bosses 51 so as to be parallel to the side surfaces of the wheel 43 (the disc rotor). The pressure plate 49 is supported in the fixing hole 53 of the bearing boss 51 so as to be brought into abutment with the pad holding member 19 via the link arm 47.

Figure 5A:
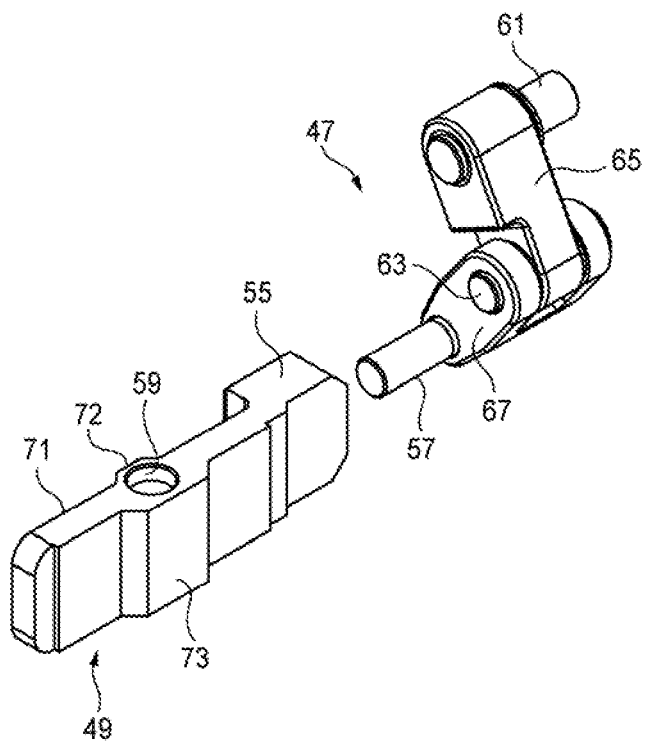
FIG. 5A is an enlarged view of the link arm and a pressure plate shown in FIG. 4.
Figure 5B:
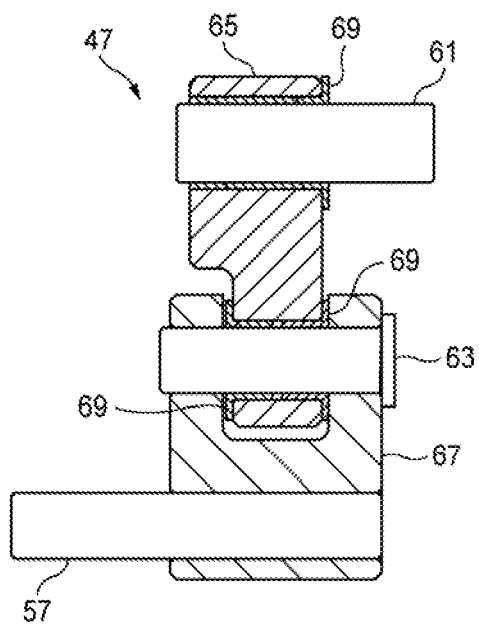
FIG. 5B is a sectional view of the link arm.
Figure 6:
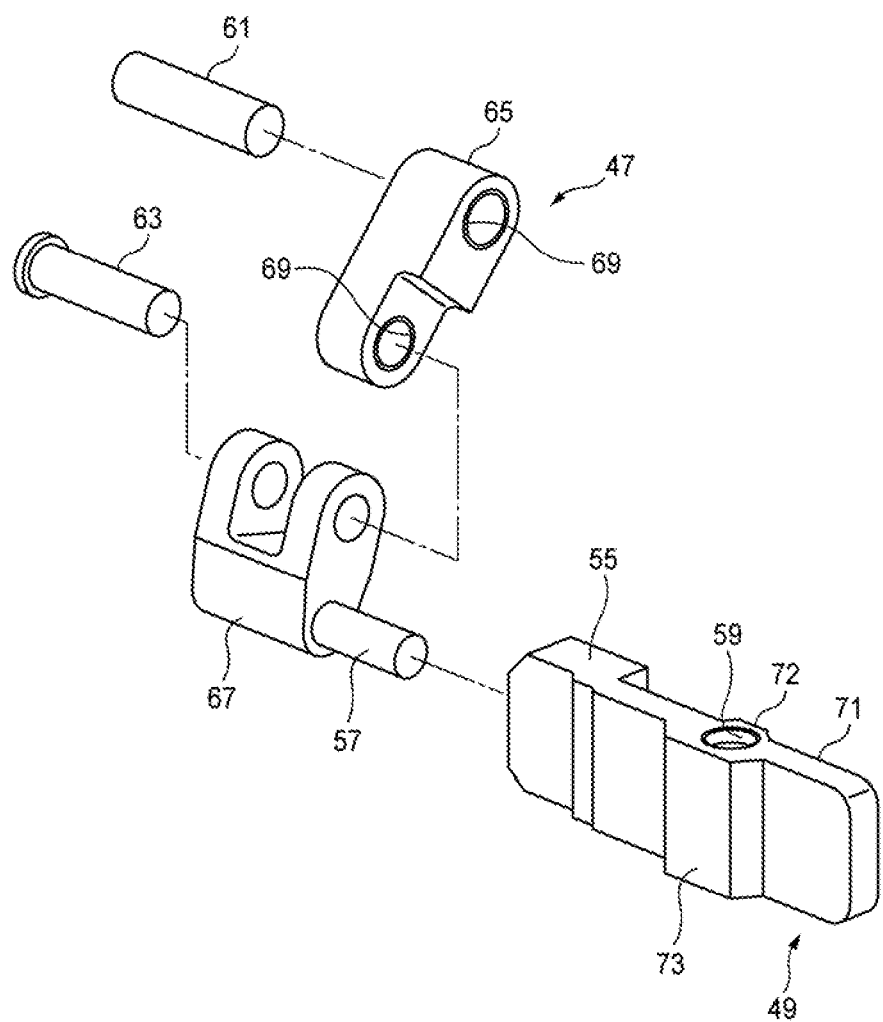
FIG. 6 is an exploded perspective view of the link arm shown in FIG. 5A.

As shown in FIGS. 5 and 6, the pressure plate 49 is brought into abutment with a back side (an opposite side to a side which faces the disc rotor) of the pad holding member 19. The pressure plate 49 is formed substantially into a short strip-like shape which is elongated horizontally and is disposed in a direction which follows a center axis of the fixing hole 53. A thick portion 55 is formed at one end portion or a proximal end portion of the pressure plate 49. A moving shaft inserting hole 56 (refer to FIG. 8) is formed in this thick portion 55, and a moving shaft 57, which will be described later, of the link arm 47 is inserted into this moving shaft inserting hole 56. A pair of engaging holes 59, whose center axes extend in the up-and-down direction, are depressed on substantially central portions of an upper and lower surfaces of the pressure plate 49 which are at right angles to an abutment surface 71 thereof. The engaging holes 59 of the pressure plate 49 are locked individually by distal ends (locking projecting portions) of the holder shafts 37. The distal ends of the holder shafts 37 are loosely fitted in the engaging holes 59 of the pressure plate 49 so as to provide a gap which permits a predetermined inclination of the pressure plate 49 when the wheel 43 (the disc rotor) is inclined. This allows the pressure plate 49 and the holder shafts 37 to move relatively in a radial direction of the holder shafts 37, whereby there is no such situation that a relative movement of the pressure plate 49 to the pad member 19 is interrupted.

A guide portion 72 is provided on the abutment surface 71 of the pressure plate 49 so as to protrude therefrom, so that the guide portion 72 is brought into engagement with a guide groove 26 which is formed on a back surface of the pad holding member 19 so as to extend in the up-and-down direction (refer to FIG. 8). Then, the abutment surface 71 of the pressure plate 49 is guided so as to move relative to the pad holding member 19.

As shown in FIGS. 5 and 6, the link arm 47, which supports the pressure plate 49 on the bearing boss 51 of the caliper body 25, is made up of a fixing shaft 61, the moving shaft 57, a first joint member 65 and a second joint member 67 which make up at least two of joint members, and a connecting shaft 63. The fixing shaft 61 is fixed in fixing hole 53 of the bearing boss 51 to thereby be provided so as to project from the caliper body 25 in parallel to the side surface of the wheel 43 (the disc rotor). Then, the pressure plate 49 is pressed against a longitudinally middle portion of the pad holding member 19 along the holder shafts 37.

The moving shaft 57 is provided parallel to the fixing shaft 61 and supports the pressure plate 49 so as not only to rotate but also to move back and forth freely thereon. The moving shaft 57 is fitted in the moving shaft inserting hole 56 (refer to FIG. 8) which is opened in the thick portion 55 of the pressure plate 49 via a sliding bush 58 so as not only to rotate but also to move back and forth freely. The moving shaft 57 which supports the pressure plate 49 and the fixing shaft 61 which is fixed in the bearing boss 51 of the caliper body 25 are connected together by means of the first joint member 65 and the second joint member 67 which make up the plurality of joint members.

The joint members of the invention are made up of at least two of joint members which connect the fixing shaft 61 and the moving shaft 57 together. In the first embodiment, the joint members are made up of the first joint member 65 which is a fixing shaft side joint member and the second joint member 67 which is a moving shaft side joint member. The fixing shaft 61 is supported rotatably at one end portion and the connecting shaft 63 is supported rotatably at the other end portion of the first joint member 65. The connecting shaft 63 is fixed to one end portion and the moving shaft 57 is fixed to the other end portion of the second joint member 67.

The connecting shaft of the invention is made up of at least one of shafts which support rotatably the joint members. In this embodiment, since the joint members are made up of the first joint member 65 and the second joint member 67, there is provided one connecting shaft, which is the connecting shaft 63, for connecting these joint members together. Sliding bushes 69 are interposed individually in a portion where the fixing shaft 61 penetrates the first joint member 65 and a portion where the connecting shaft 63 penetrates the first joint member 65.

The fixing shaft 61, the connecting shaft 63 and the moving shaft 57 of the link arm 47 are all disposed parallel to the side surface of the wheel 43 (the disc rotor) and directed in the same direction (a direction which is at right angles to the up-and-down direction). In the link arm 47 which is configured in the way described above, the moving shaft 57 can move in a direction in which the moving shaft 57 moves towards or away from the side surface of the wheel 43 (the disc rotor) and in the up-and-down direction (the direction which follows the axes of the holder shafts 37) while being kept parallel to the side surface at all times.

The spring member 45 elastically biases the abutment surface 71 of the pressure plate 49 in a direction in which the abutment surface 71 is pressed against the pad holding member 19. As described above, the engaging holes 59 of the pressure plate 49 and the distal ends of the holder shafts 37 are brought into engagement with each other with the slight gap provided therebetween. Due to this, the pressure plate 49 can move relative to the distal ends of the holder shafts 37 in the radial direction of the holder shafts 37. The spring member 45 presses the pressure plate 49 against the pad holding member 19 within the range of this relative movement. As a result, the abutment surface 71 of the pressure plate 49 is pressed against the pad holding member 19 by means of an elastic biasing force of the spring member 45.

The spring member 45 of the first embodiment is formed of a plate spring which covers an outer surface 73 of the pressure plate 49. Abutment bent portions 74, 75 (refer to FIG. 3) are formed at both ends of the spring member 45 along the direction of an axis of the moving shaft 57 so as to be bent towards the pressure plate 49. The abutment bent portions 74, 75 of the spring member 45 are brought into abutment with the outer surface 73 at ends of the pressure plate 49 (refer to FIG. 8). A pair of upper and lower support plate portions 77 (refer to FIG. 7) are formed at substantially central portions of an upper and lower edges of the spring member 45 which is formed of the plate spring so as to project from the upper and lower edges towards the pad holding member 19. The spring member 45 is supported on the pad holding member 19 via the holder shafts 37 as a result of the distal ends (the locking projecting portions) of the holder shafts 37 penetrating through holes 77a of the support plate portions 77. The spring member 45 covers the pressure plate 49, whereby the spring member 45 also functions to protect the pressure plate 49 from damage made by a piece of flying stone.

In this way, the parallelism maintaining control mechanism 23 of the first embodiment is made up of the three parts of the link arm 47, the pressure plate 49 and the spring member 45. Then, the link arm 47 is made up of the first joint member 65 and the second joint member 67, the connecting shaft 63, the moving shaft 57 and the sliding bushes 69. These constituent members can be assembled together in advance, and the number of parts to be replaced is reduced, whereby the attachment and replacement are facilitated.

In addition, the link arm 47 of the parallelism maintaining control mechanism 23 of the first embodiment is disposed near a substantial center along the arm shaft 29 which is the turning center shaft of the brake arm 15 to connect together the caliper body 25 and the pad holding member 19. Thus, when compared with a case where the parallelism maintaining control mechanism 23 is disposed at a lower portion, it becomes more difficult for the parallelism maintaining control mechanism 23 to be damaged by a piece of flying stone or the like.

Then, the parallelism maintaining control mechanism 23 of the first embodiment can press the lining surfaces 41 of the pads 39 which are held by the pad holding member 19 against the side surface of the wheel 43 (the disc rotor) in parallel not only when new pads are used as shown in FIGS. 9A, 9B but also when the pads get worn as shown in FIGS. 9C, 9D.

Next, the operation of the disc brake apparatus 11 which is configured in the way described heretofore will be described.

Figure 10A:
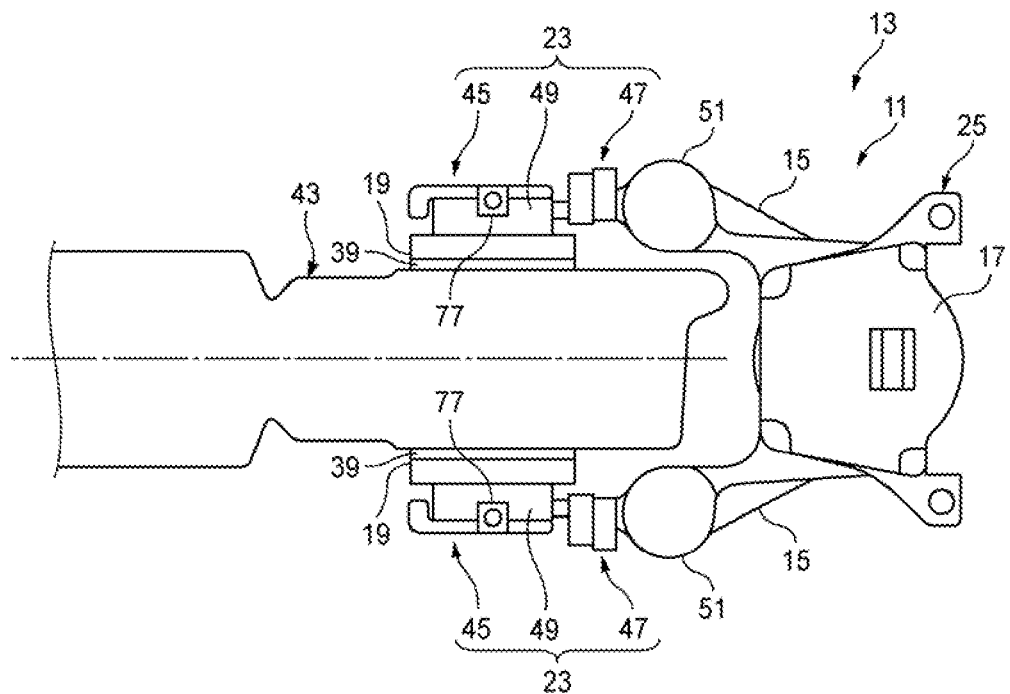
FIG. 10A is a plan view of the disc brake apparatus shown in FIG. 1 when the brake is applied in a normal state.

In the disc brake apparatus 11 according to the first embodiment, the pair of brake arms 15 are supported on the caliper body 25 so as to be swingable about the arm shafts 29. In the pair of brake arms 15, when the swing ends 33 are caused to move away from each other by the actuator 17 provided on the caliper body 25, the space defined by the other swing ends 35 thereof is narrowed. The pad holding members 19 which hold the pads 39 are supported at the other swing ends 35 of the pair of brake arms 15 so as to turn about the holder shafts 37. As shown in FIG. 10A, the pad holding members 19 which are supported at the other swing ends 35 of the brake arms 15 so as to turn freely by the turning shafts 37 are guided by the corresponding parallelism maintaining control mechanisms 23 so that the lining surfaces 41 of the pads 39 which are held by the pad holding members 19 become parallel to the wheel 43 (the disc rotor).

The parallelism maintaining control mechanisms 23 each have the pressure plate 49 and the link arm 47 which bring the pads 39 into press contact with the wheel 43 (the disc rotor) in a parallel fashion. The link arms 47 are each made up of the fixing shaft 61, the moving shaft 57, the first joint member 65 and the second joint member 67, and the connecting shaft 63. The fixing shaft 61 projects from the bearing boss 51 of the caliper body 25 so as to be parallel to the side surface of the wheel 43 (the disc rotor). The moving shaft 57, which is directed in the same direction as the fixing shaft 61, is supported movably on the fixing shaft 61 via the first joint member 65 and the second joint member 67 which are connected together by the connecting shaft 63, which is directed in the same direction as the fixing shaft 61. Then, the moving shaft 57 is supported on the bearing boss 51 of the caliper body 25 by the link arm 47 so as to move not only in the up-and-down direction but also in the direction in which the moving shaft 57 moves towards or away from the wheel 43 (the disc rotor) while being kept parallel to the side surface of the wheel 43 (the disc rotor).

The spring member 45 is fixed to the pad holding member 19, and the spring member 45 elastically biases the abutment surface 71 of the pressure plate 49 in the direction in which the abutment surface 71 is pressed against the back surface of the pad holding member 19. Namely, the pressure plate 49 is brought into abutment with the back surface of the pad holding member 19 by means of the biasing force of the spring member 45. The spring member 45 presses the outer surface 73 of the pressure plate 49 at both the ends of the pressure plate 49 with the holder shafts 37 held therebetween. The spring member 45 presses the pressure plate 49 against the pad holding member 19 so as not to generate a moment about the holder shafts 37 in the pressure plate 49. By adopting this configuration, in a normal state where a load of a certain magnitude or greater is not applied to the parallelism maintaining control mechanism 23, the posture of the pad holding member 19 which is tightly secured to the abutment surface 71 of the pressure plate 49 is maintained so that the lining surfaces 41 of the pads 39 become parallel to the wheel 43 (the disc rotor).

Figure 13:
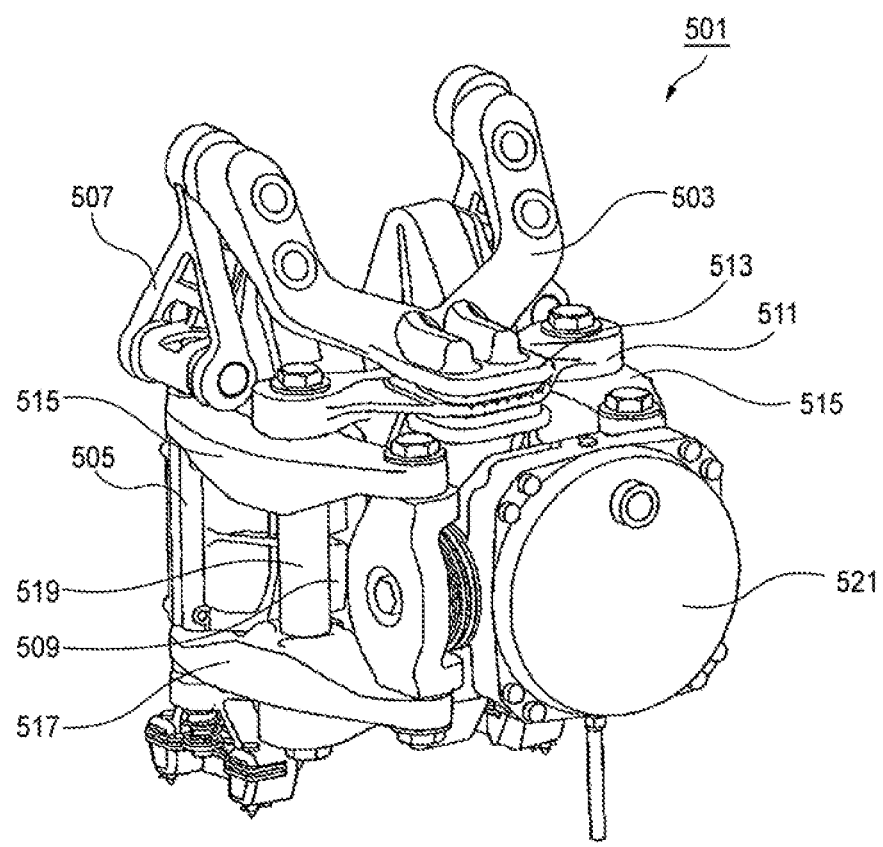
FIG. 13 is a side view of a conventional disc brake apparatus.

The link arm 47 of the first embodiment has the two joint members or the first joint member 65 and the second joint member 67. By adopting this configuration, when compared with the conventional suspension link 507 (refer to FIG. 13) which is one long joint member, the individual joint members can be made short in length, whereby even with the compact construction, the link arm 47 allows the moving shaft 57 to translate in a horizontal direction relative to the fixing shaft 61. Namely, with the conventional suspension link 507, in order to cause the brake pad holder 505 to translate as horizontally as possible, the space between the rotating shaft of the attachment bracket 503 and the rotating shaft of the brake pad holder 505 has to be widened to ensure the great turning radius.

Consequently, it is possible to provide the disc brake apparatus 11 which includes the compact parallelism maintaining control mechanisms 23.

On the other hand, in the disc brake apparatus 11 of the first embodiment, when a load of a certain degree or greater is applied to the pad holding member 19 via the pads 39 due to a reaction force from the wheel 43 (the disc rotor) or the like whereby a moment load of the pad holding member 19 is transmitted to the abutment surface 71 of the pressure plate 49, the pressure plate 49 is allowed to move relative to the pad holding member 19 against the biasing force of the spring member 45. Namely, the holder shafts 37 and the pressure plate 49 move relative to each other by deforming elastically the spring member 45 within the range of the slight gap.

Figure 10B:
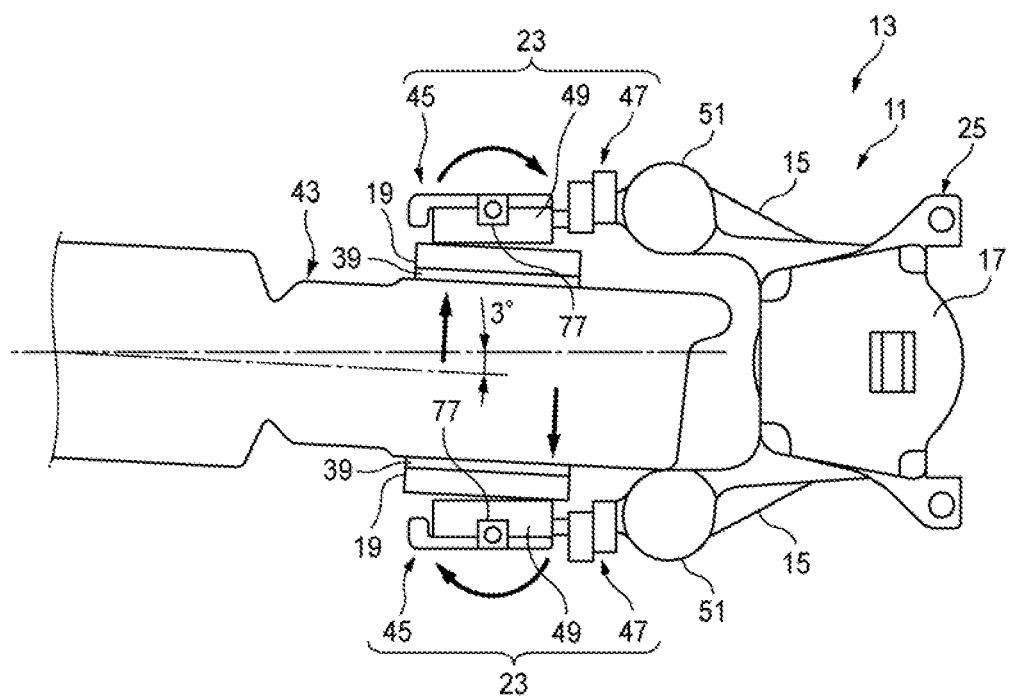
FIG. 10B is a plan view of the disc brake apparatus shown in FIG. 1 when the brake is applied with a wheel inclined.

The abutment surface 71 of the pressure plate 49 and the pad holding member 19 are released from the tightly secured state, thereby making it possible to generate a gap therebetween. Namely, as shown in FIG. 10B, in the event that a great moment load is generated in the link arm 47 when the wheel 43 (the disc rotor) is inclined, the spring member 45 deflects (is elastically deformed), and the pad holding member 19 and the link arm 47 are separated from each other. The parallelism maintaining control mechanism 23 is required to deal with an inclination of the wheel 43 (the disc rotor) of a maximum angle of ±3°. Consequently, the pad holding member 19 (the pads 39) can change its angle along the wheel 43 (the disc rotor), whereby the lining surfaces 41 of the pads 39 can be pressed against the wheel 43 (the disc rotor) uniformly. As a result, with the disc brake apparatus 11, eccentric wear or drag is restrained from being generated in the pads 39.

In addition, since the abutment surface 71 of the pressure plate 49 can move relative to the pad holding member 19, an excessive load that would otherwise be applied to the link arm 47 is eliminated. Namely, although the pads 39 maintain parallel postures along the axis of the moving shaft 57 when the pad holding member 19 is opened moderately, when the brake is applied, the pads 39 can change their postures along the wheel 43 (the disc rotor).

With the disc brake apparatus 11 of the first embodiment, the distal ends (the locking projecting portions) of the holder shafts 37 which support the pad holding member 19 so as to turn freely are locked in the engagement holes 59 which are depressed on the upper and lower surfaces of the pressure plate 49, whereby the pressure plate 49 can be assembled to the pad holding member 19, this facilitating the assemblage of the pressure plate 49 to the pad holding member 19. Since the distal ends (the locking projecting portions) of the holder shafts 37 are individually loosely fitted in the engagement holes 59 of the pressure plate 49 so as to generate the gap which permits the predetermined inclination of the locking projecting portion when the wheel 43 (the disc rotor) is inclined, there is no such situation that the relative movement of the pressure plate 49 to the pad holding member 19 is interrupted.

With the disc brake apparatus 11 of the first embodiment, since the abutment surface 71 of the pressure plate 49 is guided so as to move relative to the pad holding member 19, the abutment surface 71 of the pressure plate 49 can be caused to move smoothly relative to the pad holding member 19.

In addition, with the disc brake apparatus 11 of the first embodiment, the fixing shaft 61 is fixed to each of the bearing bosses 51 which support the pair of brake arms 15 so as to be swingable relative to the caliper body 25, and the pressure plate 49 is pressed against the longitudinally middle portion of the pad holding member 19 along the turning shafts thereof. Then, the parallelism maintaining control mechanism 23 is situated so as to connect the longitudinally middle portion of the pad holding member 19 along the turning shafts thereof which lie near the center of the pad assembly 21 and the bearing boss 51 of the caliper body 25 together and is configured light in weight and small in size.

With the disc brake apparatus 11 of the first embodiment, the pressure plate 49 is covered by the spring member 45 to thereby be protected against damage made by a piece of flying stone. In addition, since the spring member 45 is disposed on a mechanism surface side (an opposite side to a side facing the wheel 43) of the parallelism maintaining control mechanism 23 which is visible from an exterior portion, it is possible to easily verify how the spring member 45 is attached to the parallelism maintaining control mechanism 23 or whether or not the spring member 45 is damaged in a visual fashion. Additionally, the through holes 77a are formed in the support plate portions 77 which are formed at the upper and lower edges of the spring member 45 which is formed of the plate spring, and the distal ends (the locking projecting portions) of the holder shafts 37 which lock the engagement holes 59 of the pressure plate 49 are put through the through holes 77a, whereby the spring member 45 is supported on the pad holding member 19.

In addition, with the disc brake 13 for a railway vehicle which includes the disc brake apparatus 11 configured as described above, when the wheel 43 (the disc rotor) is inclined, the lining surfaces 41 of the pads 39 are allowed to follow the wheel 43 (the disc rotor) in parallel. By doing so, when braking the railway vehicle which is running on a curved track or a track having alternate right and left turns, in the event that the wheel 43 (the disc rotor) is inclined, the pad holding member 19 which is released from the tightly secured state with the pressure plate 49 against the biasing force of the spring member 45 follows the wheel 43 (the disc rotor) in parallel. As a result, a load is eliminated which would otherwise be applied to the parallelism maintaining control mechanism 23 by the inclined wheel 43 (disc rotor).

In this way, in the disc brake 13 for a railway vehicle, in the event that the pads 39 (the pad assembly 21) are inclined when braking the railway vehicle which is running on the curved track or the track having alternate left and right turns, the tightly secured state between the pads 39 and the pressure plate 49 is released so as not to interrupt the braking operation of the pads 39. Moreover, the link arm 47 of the parallelism maintaining control mechanism 23 is also prevented from bearing an excessive load.

Consequently, according to the disc brake apparatus 11 of the first embodiment, the postures of the pads 39 are kept parallel to the wheel 43 (the disc rotor) by the compact parallelism maintaining control mechanism 23, and at the same time, the eccentric wear and drag can be prevented from being generated in the pads 39 by the parallelism maintaining control mechanism 23.

According to the disc brake 13 for a railway vehicle of the first embodiment, the pads 39 are allowed to follow the inclined wheel 43 (disc rotor), whereby the eccentric wear and drag can be prevented from being generated in the pads 39.

Next, a disc brake apparatus 11A according to a second embodiment of the invention will be described.

Figure 11:
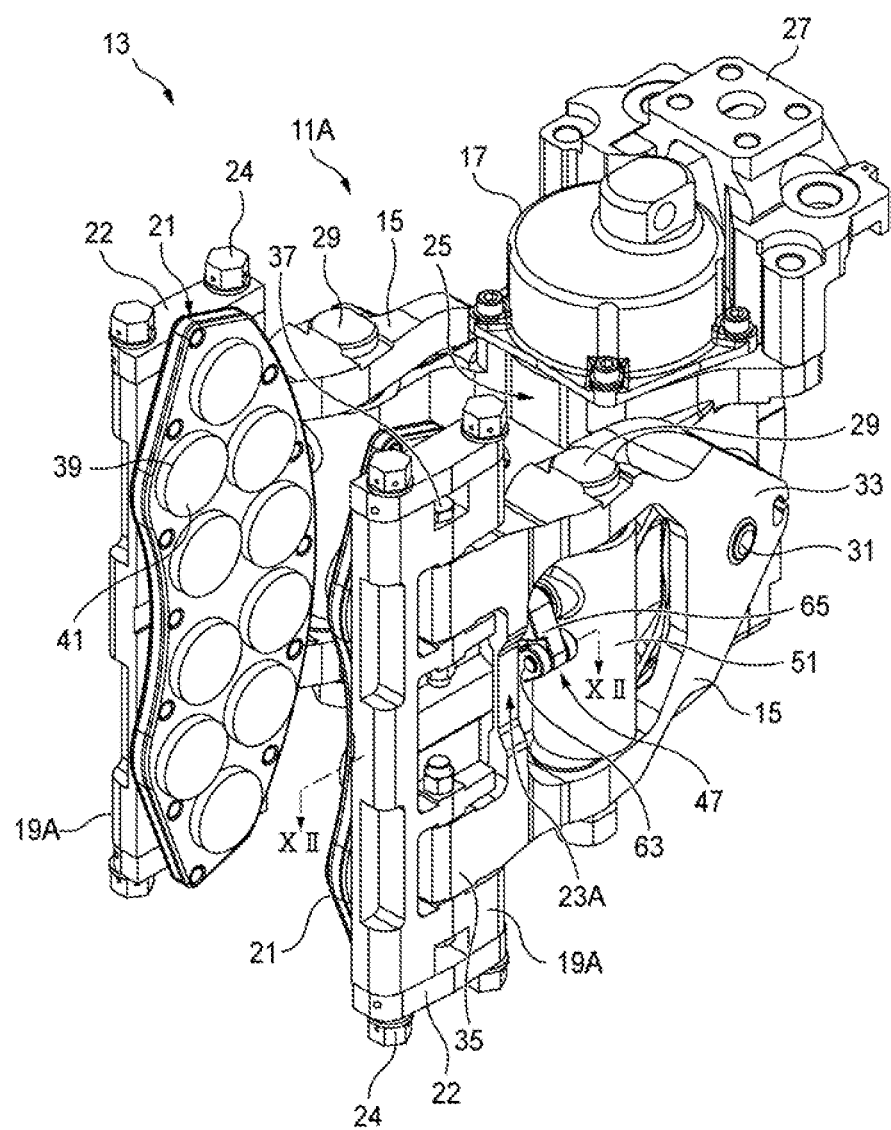
FIG. 11 is a perspective view of a disc brake apparatus according to a second embodiment of the invention.
Figure 12:
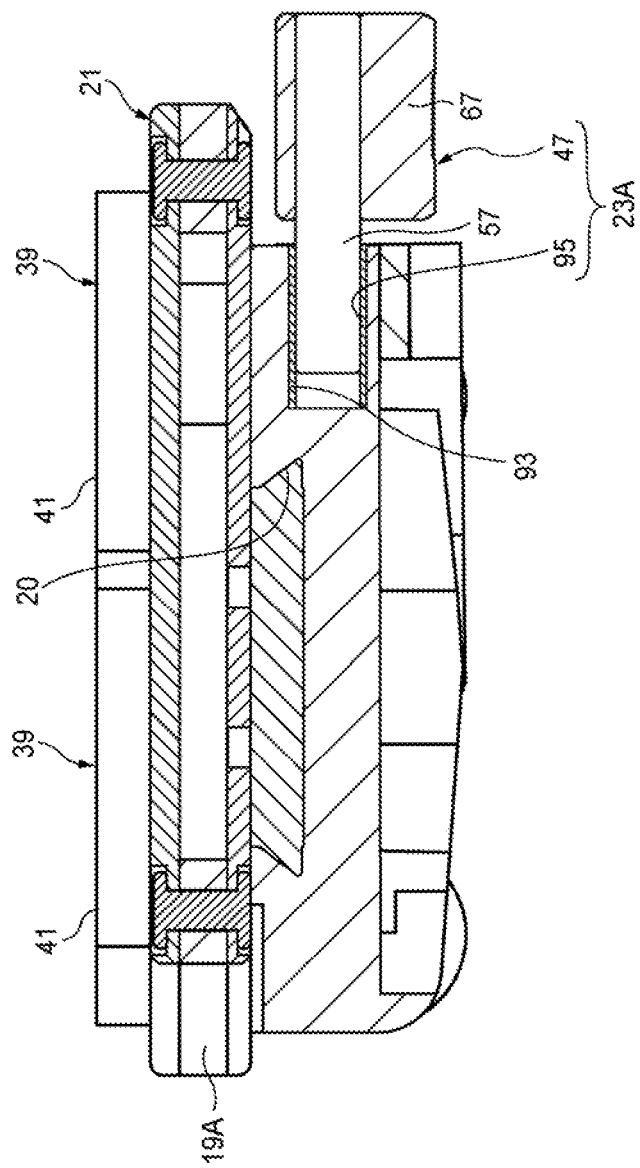
FIG. 12 is a sectional view taken along a line indicated by and viewed from arrows XII-XII in FIG. 11.

As shown in FIGS. 11 and 12, a disc brake apparatus 11A according to a second embodiment is configured the same as the disc brake apparatus 11 according to the first embodiment except that the parallelism maintaining control mechanism 23 is replaced by a parallelism maintaining control mechanism 23A. Thus, like reference numerals will be given to like members to those of the disc brake apparatus 11 of the first embodiment, and a detailed description of the like members will be omitted here.

The parallelism maintaining control mechanism 23A according to the second embodiment is configured to press lining surfaces 41 of pads 39 which are held on a pad holding member 19A against a side surface of a wheel 43 (a disc rotor) in parallel and has a moving shaft inserting hole 93 which is formed in the pad holding member 19A and a link arm 47, as shown in FIGS. 11 and 12.

A moving shaft 57 of the link arm 47 according to the second embodiment is disposed parallel to a fixing shaft 61 and is fitted in the moving shaft inserting hole 93 of the pad holding member 19A via a sliding bush 95 so as not only to rotate but also to move back and forth, as shown in FIG. 12.

Next, the operation of the disc brake apparatus 11A which is configured in the way described heretofore will be described.

With the disc brake apparatus 11A according to the second embodiment, the pad holding member 19A is guided by the parallelism maintaining control mechanism 23A so that the lining surfaces 41 of the pads 39 held on the pad holding member 19A become parallel to the wheel 43 (the disc rotor).

The parallelism maintaining control mechanisms 23A each have the link arm 47 which bring the pads 39 into press contact with the wheel 43 (the disc rotor) in a parallel fashion. The link arms 47 are each made up of the fixing shaft 61, the moving shaft 57, the first joint member 65 and the second joint member 67, and the connecting shaft 63. The moving shaft 57 is supported on a bearing boss 51 of a caliper body 25 by the link arm 47 so as to move not only in an up-and-down direction but also in a direction in which the moving shaft 57 moves towards or away from the wheel 43 (the disc rotor) while being kept parallel to the side surface of the wheel 43 (the disc rotor).

The moving shaft inserting hole 93 in the pad holding member 19A is fitted on the moving shaft 57 in a direction in which the lining surfaces 41 of the pads 39 become parallel to the wheel 43 (the disc rotor) in such a way that the moving shaft inserting hole 93 rotates and moves back and forth on the moving shaft 57.

By adopting this configuration, the parallelism maintaining control mechanism 23A maintains the posture of the pad holding member 19A so that the lining surfaces 41 of the pads 39 become parallel to the wheel 43 (the disc rotor).

Consequently, it is possible to provide the disc brake apparatus 11A which includes the compact parallelism maintaining control mechanisms 23A.

Further, according to the disc brake apparatuses 11, 11A of the first and second embodiments, since the parallelism maintaining control mechanism 23, 23A is disposed near the center along the arm shaft 29 which constitutes the swing axis of the brake arm 15 so as to connect the caliper body 25 and the pad holding member 19 together and no braking torque is inputted directly into the parallelism maintaining control mechanism 23, 23A, it is possible to realize the parallelism maintaining control mechanism which is small in size and light in weight.

Here, aspects of the disc brake apparatus and the disc brake for a railway vehicle according to the embodiments of the invention will briefly be summarized item by item below.

[1] The disc brake apparatus (11A) including:
the base member (the caliper body 25);
the pair of brake arms (15) which are pivotally supported to be swingable with respect to the base member (the caliper body 25);
the actuator (17) which is connected to the swing ends (33) of the pair of brake arms (15) so as to move the brake arms (15) away from each other;
the pad holding members (19) which are supported pivotally at the other swing ends (35) of the pair of brake arms (15) so as to turn freely thereat; and
the parallelism maintaining control mechanisms (23A) which bring the lining surfaces (41) of the pads (39) which are held on the pad holding members (19) into press contact with the disc rotor (the wheel 43) in a parallel fashion.

The parallelism maintaining control mechanisms (23A) are each disposed near the center along the swing axis (the arm shaft 29) of the brake arm (15) so as to connect the base member (the caliper body 25) and the pad holding member (19) together.

[2] The disc brake apparatus (11A) including:
the base member (the caliper body 25);
the pair of brake arms (15) which are pivotally supported to be swingable with respect to the base member (the caliper body 25);
the actuator (17) which is connected to the swing ends (33) of the pair of brake arms (15) so as to move the brake arms (15) away from each other;
the pad holding members (19) which are supported pivotally at the other swing ends (35) of the pair of brake arms (15) so as to turn freely thereat; and
the parallelism maintaining control mechanisms (23A) which bring the lining surfaces (41) of the pads (39) which are held on the pad holding members (19) into press contact with the disc rotor (the wheel 43) in a parallel fashion.

The parallelism maintaining control mechanisms (23A) each include the link arm (47) which includes:
the fixing shaft (61) which projects from the base member (the caliper body 25) so as to be parallel to the side surface of the disc rotor (the wheel 43);
the moving shaft (57) which is disposed parallel to the fixing shaft (61) and which is fitted in the moving shaft insertion hole (93) in the pad holding member (19A) so as not only to rotate but also to move back and forth therein;
at least two of joint members (the first joint member 65 and the second joint member 67) which connect the fixing shaft (61) and the moving shaft (57) together in parallel; and
at least one of connecting shafts (63) which support the joint members so at to rotate thereon.

[3] The disc brake apparatus (11) including:
the base member (the caliper body 25);
the pair of brake arms (15) which are pivotally supported to be swingable with respect to the base member (the caliper body 25);
the actuator (17) which is connected to the swing ends (33) of the pair of brake arms (15) so as to move the brake arms (15) away from each other;
the pad holding members (19) which are supported pivotally at the other swing ends (35) of the pair of brake arms (15) so as to turn freely thereat; and
the parallelism maintaining control mechanisms (23) which bring the lining surfaces (41) of the pads (39) which are held on the pad holding members (19) into press contact with the disc rotor (the wheel 43) in a parallel fashion.

The parallelism maintaining control mechanisms (23) each includes:
the pressure plate (49) which is brought into abutment with the pad holding member (19); the link arm (47) including:
the fixing shaft (61) which projects from the base member (the caliper body 25) so as to be parallel to the side surface of the disc rotor (the wheel 43);
the moving shaft (57) which is disposed parallel to the fixing shaft (61) and which supports the pressure plate (49) so as not only to rotate but also to move back and forth freely thereon;
at least two of joint members (the first joint member 65 and the second joint member 67) which connect the fixing shaft (61) and the moving shaft (57) together in parallel; and
at least one of connecting shafts (63) which support the joint members so at to rotate thereon; and the spring member (45) which elastically biases the abutment surface (71) of the pressure plate (49) in the direction in which the abutment surface (71) is pressed against the pad holding member (19).

[4] The disc brake apparatus (11) according to [3] above, wherein the pair of engagement holes (59) whose center axes extend along the up-and-down direction are depressed into the upper and lower surfaces of the pressure plate (49) which are at right angles to the abutment surface (71) thereof, and wherein the locking projecting portions (the distal ends of the holder shafts 37) which lock individually the engagement holes (59) to the pad holding member (19) are fitted individually loosely in the holes so as to generate the gap which permits the predetermined inclination of the locking projecting portions.

[5] The disc brake apparatus (11) according to [3] or [4] above, wherein the abutment surface (71) of the pressure plate (49) is guided so as to move relative to the pad holding member (19).

[6] The disc brake apparatus (11) according to any one of [3] to [5] above, wherein the fixing shaft (61) is fixed to each of the bearing bosses (51) which support the pair of brake arms (15) so as to be swingable relative to the base member (the caliper body 25), and wherein the pressure plate (49) is pressed against the longitudinally middle portion of the pad holding member (19) along the turning shaft thereof.

[7] The disc brake apparatus (11) according to any one of [3] to [6] above, wherein the spring member (45) is formed of the plate spring which covers the outer surface (73) of the pressure plate (49).

[8] The disc brake (13) for a railway vehicle including the disc brake apparatus (11, 11A) according to any one of [1] to [7].

The invention is not limited to the embodiments that have been described heretofore and hence can be modified or improved as required. In addition, the materials, shapes, dimensions, numbers, arranging positions and the like of the constituent elements described in the embodiments are arbitrary and hence are not limited thereto, provided that those elements can achieve the invention.

This patent application is based on Japanese Patent Application (No. 2014-169559) filed on Aug. 22, 2014, the contents of which are incorporated herein by reference.

INDUSTRIAL APPLICABILITY

According to the disc brake apparatus and the disc brake for a railway vehicle which have been described heretofore, the postures of the pads are kept parallel to the disc rotor by the compact parallelism maintaining control mechanism, whereby eccentric wear and drag can be prevented from being generated in the pads.

DESCRIPTION OF REFERENCE NUMERALS AND SIGNS

11: disc brake apparatus; 13: disc brake for railway vehicle; 15: brake arm; 17: actuator, 19: pad holding member, 23: parallelism maintaining control mechanism; 25 caliper body (base member); 33: one swing end; 35: the other swing end; 39: pad; 41: lining surface; 43: wheel (disc rotor); 45: spring member, 47: link arm; 49: pressure plate; 57: moving shaft; 61: fixing shaft; 63: connecting shaft 65: first joint member (joint member); 67: second joint member (joint member); 71: abutment surface; 73: outer surface.

The invention claimed is:

1. A disc brake apparatus comprising:
   a base member;
   a pair of brake arms pivotally supported to be swingable with respect to the base member;
   an actuator connected to one of swing ends of each of the pair of brake arms so as to move the brake arms away from each other;
   a pad holding member pivotally supported at the other of the swing ends of the each of the pair of brake arms so as to freely turn; and
   a parallelism maintaining control mechanism configured to press a lining surface of a pad held on the pad holding member to a disc rotor while maintaining the lining surface parallel to the disc rotor,
   wherein the parallelism maintaining control mechanism includes a link arm which comprises:
   a fixing shaft projecting from the base member so as to be parallel to a side surface of the disc rotor;
   a moving shaft disposed parallel to the fixing shaft and fitted in a moving shaft insertion hole in the pad holding member to be rotatable and movable back and forth;
   at least two joint members which connect the fixing shaft and the moving shaft together so that the fixing shaft and the moving shaft extend in parallel to each other; and
   at least one connecting shaft which supports the joint members so that the joint members are rotatable with respect to each other.

2. A disc brake for a railway vehicle comprising the disc brake apparatus according to claim 1.

3. The disc brake apparatus according to claim 1, wherein the fixing shaft is perpendicular to a swing axis of the brake arm.

4. A disc brake apparatus comprising:
   a base member;
   a pair of brake arms pivotally supported to be swingable with respect to the base member;
   an actuator connected to one of swing ends of each of the pair of brake arms so as to move the brake arms away from each other;
   a pad holding member pivotally supported at the other of the swing ends of the each of the pair of brake arms so as to freely turn; and
   a parallelism maintaining control mechanism configured to press a lining surface of a pad held on the pad holding member to a disc rotor in a parallel fashion,
   wherein the parallelism maintaining control mechanism includes:
   a pressure plate which is brought into abutment with the pad holding member;
   a link arm including:
      a fixing shaft projecting from the base member so as to be parallel to a side surface of the disc rotor;
      a moving shaft which is disposed parallel to the fixing shaft and which supports the pressure plate so as to be rotatable and movable back and forth;
      at least two joint members which connect the fixing shaft and the moving shaft together in parallel; and
      at least one connecting shaft which supports the joint members so at to be rotatable with respect to each other; and
   a spring member which elastically biases an abutment surface of the pressure plate in a direction in which the abutment surface is pressed against the pad holding member.

5. The disc brake apparatus according to claim 4, wherein a pair of engagement holes whose center axes extend along an up-and-down direction are depressed on upper and lower surfaces of the pressure plate which are perpendicular to the abutment surface, and
   wherein locking projecting portions which respectively lock the engagement holes to the pad holding member are respectively fitted loosely in the engagement holes with gaps for permitting the locking projecting portions from inclining in predetermined inclinations.

6. The disc brake apparatus according to claim 4, wherein the abutment surface of the pressure plate is guided so as to move relative to the pad holding member.

7. The disc brake apparatus according to claim 4, wherein the fixing shaft is fixed to each of bearing bosses which pivotally support the pair of brake arms so as to be swingable relative to the base member, and
   wherein the pressure plate is pressed against a longitudinally middle portion of the pad holding member along a turning shaft of the pressure plate.

8. The disc brake apparatus according to claim 4, wherein the spring member is formed of a plate spring which covers an outer surface of the pressure plate.

9. A disc brake for a railway vehicle comprising the disc brake apparatus according to claim 4.

* * * * *